W. COMBE.
Gas Purifier.
No. 36,752. Patented Oct. 21, 1862.
Fig. 1.
Fig. 3.
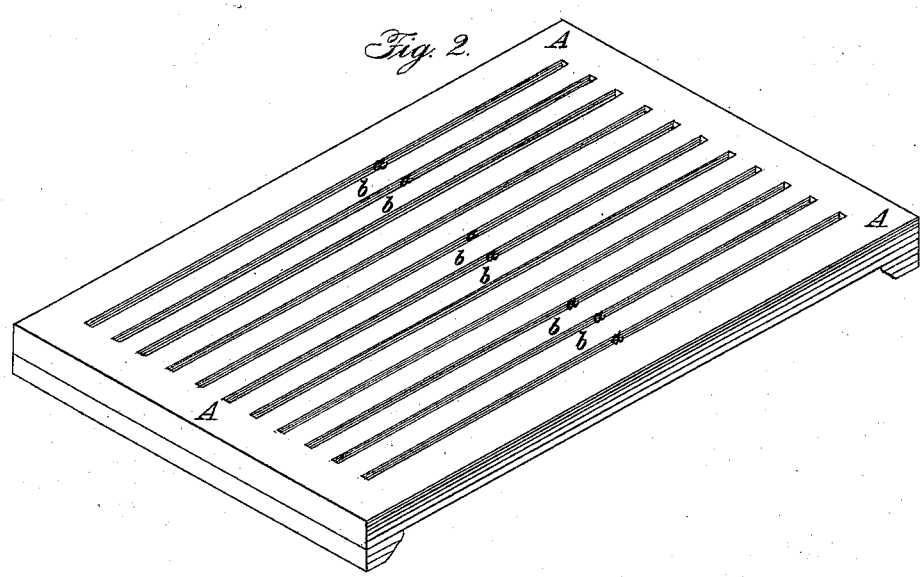
Fig. 2.
Witnesses:
Inventor:

UNITED STATES PATENT OFFICE.

WILLIAM COMBE, OF NEW YORK, N. Y., ASSIGNOR TO NATHANIEL O. HAWKSHURST, OF QUEENS COUNTY, N. Y.

IMPROVEMENT IN WOODEN SIEVES FOR GAS-PURIFIERS.

Specification forming part of Letters Patent No. 36,752, dated October 21, 1862.

*To all whom it may concern:*

Be it known that I, WILLIAM COMBE, of the city, county, and State of New York, have invented certain new and useful Improvements in the Construction of Gratings for Dry-Lime Gas-Purifiers; and I do hereby declare and ascertain my said invention, referring to the accompanying drawings, in which.

Figure 1 is a transverse section of the grating. Fig. 2 is a plan thereof. Fig. 3 is a sectional view showing a modification in which the upper surface of each bar of the grating is convexed.

Heretofore gratings have been employed in dry-lime gas-purifiers, have been made of perforated metallic plates, which were quite thin, and consequently the apertures were kept at all times open for the free admission of gas into the lime above them, but there were many difficulties and expenses attending the use of such plates, which in a short time became corroded and useless.

To obviate the difficulties attendant on the use of the metallic plates, sieves, or gratings, the use of wood was attempted; but, in order to sustain the lime and to prevent warping the wooden gratings were required to be of considerable thickness—say, an inch, more or less, according to the size of the purifier. The openings or interstices between the bars must be very small when properly made. They should not be more than three-sixteenths of an inch, or a little exceeding that size, and in practice it was found that these narrow openings became choked or filled with the fine lime, and the work required to clear them out prevented their coming into use. In this state of difficulty I devised the present bar-grating, which succeeds perfectly, giving a free ingress for the gas with a clear opening, and in changing the lime there is no trouble in freeing the grating any more than with the iron gratings or sieves before in general use.

My improved grate-bars are made broad at the top and chamfered off on the under side, so as to present a wider aperture below between the bars, as clearly shown in the drawings. This construction at once frees the bars from the lodgment of loose lime, and gives an open and free passage for the gas.

The mode of constructing the grating is to make it of one or more pieces of board cut out of the solid of suitable length, in which the apertures are channeled by machinery. The grating thus formed is battoned at the ends, as shown in the drawings, and requires fewer nails or pegs to fasten it, is less liable to displacement, and will last longer than if made by single bars, and by these improvements I have been enabled successfully to introduce for the first time in practical gas-works of wooden bottoms, sieves, or gratings in dry-lime purifiers. The bars may be made more efficient by convexing the upper surface, as seen in Fig. 3, although that is not absolutely essential.

Having thus fully described my improvement, what I claim as new, and for which I desire Letters Patent, is—

The employment of a wooden grating having the openings made expanding downward to support the lime in dry-lime purifiers in gas-works, constructed substantially as and for the purposes set forth.

WM. COMBE.

Witnesses:
 JULIUS HENIUS,
 JAMES T. RUGGLES.